2,714,582

FINELY DIVIDED DISPERSIBLE ASPHALTIC COMPOSITION AND METHOD OF MAKING THE SAME

Edward J. Day, Leominster, Mass., assignor to Lukon, Inc., Leominster, Mass., a corporation of Massachusetts No Drawing. Application April 26, 1954, Serial No. 425,759

10 Claims. (Cl. 252—311.5)

This invention relates to a dry powdered asphaltic composition which is readily dispersible in water and to a method of making the same.

The primary object of the invention is to provide an asphaltic composition in dry or substantially dry form which is capable of industrial use for the various purposes for which aqueous dispersions of asphalt have been or may be used, which may be economically produced and shipped in dry form to be readily converted into an aqueous dispersion by the user merely by introduction into water with a minimum of agitation.

Another object of the invention is to provide a dry or substantially dry novel asphaltic composition comprising a major proportion of finely divided particles of asphalt and a minor proportion of a finely divided protective colloid, preferably a protein, together with selected modifying agents by which the composition has imparted to it the unusual property of being substantially spontaneously dispersible in water, producing a colloidal dispersion of the composition in water.

A further object of the invention is to provide a novel method of making the novel dry or substantially dry, substantially spontaneously dispersible asphaltic composition.

With these general objects in view and such others as may hereinafter appear, the invention consists in the dry, readily dispersible asphaltic composition and the method of making the same hereinafter described and particularly defined in the claims at the end of this specification.

In general the present invention contemplates a novel asphaltic composition in a dry, finely divided powdered form which is characterized by its ability to readily disperse in water, forming a relatively stable colloidal dispersion. The novel dry and finely divided asphaltic composition may be used for all the purposes for which aqueous asphalt emulsions and dispersions have been or may be used and finds particular use as a sizing in the production of fiber board and in paper manufacture.

In producing the present novel and readily dispersible asphaltic composition, asphalt, either natural or synthetic, may be used as the basis for the production of the present dispersible composition, and in practice those asphalts are selected which at ordinary room temperatures are preferably of a friable as distinguished from a rubbery nature, such for example as gilsonite. The first step in the preferred process contemplates the crushing of such a friable asphalt to produce a relatively coarse powder of, for example, a degree of fineness such that a majority of the particles may pass a screen of from 100 to 150 mesh. After this relatively coarse powder has been produced, I prefer to blend therewith selected dispersing emulsifying and suspending agents and a protective colloid or equivalent protective agent. The term "dispersing agent" is used herein for convenience and should be understood to mean any suitable dispersing, emulsifying, suspending, or wetting material which will aid in the formation or maintenance of a suspension or emulsion, within the limits of the disclosure. These are preferably in the form of dry powders. The blending operation may be carried out in any suitable mixing apparatus to produce a relatively homogeneous blend, and thereafter the blended product is passed through a high speed pulverizer of any known or preferred form capable of reducing the blended powder to a degree of fineness of the order of from 300 to 325 mesh. Preferably the grinding operation is carried out in a ball mill producing a resulting ground particle which is flat as distinguished from an angular particle-like sand.

Any suitable protective colloid may be used in the present process. Among such colloids may be mentioned: Gum, glue, casein, resins with or without alkali-naphthenic acid salts, soybean flour proteins, gluten flour proteins, pectins, poly-saccharides, hemicelluloses, tannins, abluminoids, corn proteins, alpha proteins, alginates, starch, albumin, gelatins and other soya proteins.

Any suitable dispersing, emulsifying or suspending agent may be used. Typical inorganic suspending agents include: Inorganic colloid materials in solid, finely-divided form such as bentonite, other colloidal clays, such as fuller's earth and any of the other clays, earths or soils which are capable of suspending solids in an aqueous medium.

Any suitable dispersants or emulsifiers may be used including those in finely divided solid form which have been or may be used in producing the dispersion of solids in an aqueous medium, such as: Organic sulfonic acids and salts and derivatives thereof, the ligno-sulfonates of sodium, calcium and magnesium and any of the various other lignin compounds which have been used as dispersants. In addition, any of the suitable water soluble soaps may be used, such as: Resin soaps—preferably sodium resinate as well as sodium abietate, the soaps of resin derivatives and, in general, any of the suitable water-soluble soaps of fats and oils.

The following formula indicates the range of proportions of the components of the present asphaltic mix:

| | Parts by weight |
|---|---|
| Asphalt | 100 |
| Dispersing agent | 3 to 25 |
| Protective colloids | 2 to 10 |

The preferred formulation is as follows: 100 parts by weight of finely-divided dry asphalt; 7 parts by weight of a dispersing agent mixture produced by mixing 8 parts of bentonite, 2 parts of sodium ligno-sulfonate and 5 parts sodium resinate; and a protective organic colloid, preferably casein in the amount of 2 parts by weight.

The dispersing agents, which may be incorporated in the above formulations, may be individually varied over a relatively wide range, as for example, to 100 parts of the finely-divided friable dry asphalt, a minimum of about 3 parts by weight of the inorganic colloidal material may be used, together with a minimum of about one-fourth part by weight in the case of the sulfonated lignin, and the soaps employed may vary from a minimum of about 2 parts by weight. Preferably, a small proportion of a wetting surface active agent may be included among the dispersing agents as, for example, from 2 to 10 parts by weight, and typical agents of this type include: Polyoxyethylene stearate; alkylnaphthalene sodium sulfonates; sorbitan tristearate; substituted aryl sodium sulfonates; sulfated fatty alcohols and sulfonated alkylphenoxyethanols.

As a result of the above-described method of producing the present spontaneously dispersible asphaltic composition, it is believed that the modifying agents and protective colloids become so intimately associated with the individual finely divided asphalt particles, that following the introduction of a mass of the finely divided composition into water and the subjection of the same to sufficient agitation to effect wetting of the particles, the formation of the dispersion takes place immediately. In fact, by introducing a small mass of the composition into a test tube and wetting the particles by one or two agitations the spontaneous dispersion of the asphaltic composition is caused to take place.

Undoubtedly, the various modifying and protective agents above referred to function to assist in effecting the formation of the dispersion following their usual functions in the production of dispersions according to prior art methods. The exact reasons underlying the rapidity with which the present asphaltic composition forms the dispersion once the particles become wetted are not well understood. It is believed, however, that the grinding operation by which the relatively coarse blend is reduced to a fineness of the order of from 300 to 325 mesh plays an important part in effecting the intimate association of the modifying and protective agents with the individual fine asphalt particles. Either the fine individual particles of such agents become embedded in or are smeared upon the surface of the asphalt particles as a coating or are held thereto by electrical phenomena, and in any event it is believed that these agents are presented in such condition that when the particles become wet they are in a condition most conducive to the rapid dispersion of the particles in water.

In the preferred method wherein a ball mill is utilized to effect the final grinding operation, the individual particles produced are of a definitely flat shape as distinguished from an angular shape, and this may be determined by microscopic examination thereof. This flat form of the particle appears to contribute to the speed and efficiency of the dispersion and the shape of the particle also appears to contribute to the stability of the dispersion thus produced.

When used as a sizing in the manufacture of fiber board and paper, a mass of the finely divided solid asphaltic composition is dumped into the beater along with the fiber, and after the mass has become sufficiently wetted by means of the agitation in the beater, the dispersion takes place with extreme rapidity. The stability of the dispersion is sufficient to enable all of the operations in the production of the fiber board and the paper manufacture to be carried on without undesirable settling of the composition. It may be that the differences in polarity between the charges on the individual dispersed asphaltic particles and the beaten fiber further contributes to the stability of the dispersion.

While as above stated it is preferred to select those asphalts, either natural or synthetic, which are friable in nature at room temperature as distinguished from those of a rubbery nature, nevertheless if found of advantage such rubbery asphalts may be utilized as the basis for the production of the present asphaltic composition by conducting the grinding operations under refrigerated conditions.

I have also discovered that the present asphaltic composition is further characterized by its ability to assist in and/or effect the successful blending of certain otherwise incompatible chemical compounds to form a new isomorphous composition having the desirable characteristics of each component and, for example, I have found that manufacturers of composition tile, hose, mats and the like have long wanted to combine in one product the desirable qualities of vinyl compounds of the general formula $(C_4H_6O_2)_n$ or vinylidene copolymers and rubber, natural or synthetic. These two materials have been found to be incompatible and unblendable. I find, however, that when processed on standard rubber milling equipment that the addition of my dry asphaltic composition renders the two dissident components entirely compatible and isomorphous. The resulting product is one of integrity and is endowed with the highly wanted characteristics of both contributing components. The parameters are wide and range from one-half of one percent of my dry asphaltic compound, as an additive to fifteen percent, depending on the end result desired.

Again, by omitting the normally incompatible vinyl compounds and using in their place common asphalts, I find that my novel blending asphaltic powder effects a more intimate admixture than otherwise is possible. Such an asphaltic powder-common asphalt-rubber blend is useful in road surfacing and for a wide variety of products, such as rubber heels, tubing, electrical insulation, and the like.

Having thus described the invention, what is claimed is:

1. A substantially dry asphaltic mix in a finely divided dry powder form characterized by substantially spontaneous dispersibility in water after the particles have become wet, said mix comprising the following components in the following proportions:

| | Parts by weight |
|---|---|
| Finely divided friable asphaltic material | 100 |
| A finely divided dry dispersing agent selected from the group consisting of organic sulfonic acids, salts of organic sulfonic acids, ligno-sulfonate salts, water soluble soaps, polyoxyethylene stearate, sorbitan tristearate, sulfated fatty alcohols and sulfonated alkylphenoxyethanols | 3 to 25 |
| and a finely divided dry protective colloid | 2 to 10 | said mix having a degree of fineness such that a majority of the particles pass through a 300 mesh screen.

2. A substantially dry asphaltic mix as defined in claim 1, wherein the finely divided friable asphaltic material comprises mainly flat particles.

3. A substantially dry asphaltic mix as defined in claim 1, wherein the dispersing agent comprises a mixture of a soluble sulfonated lignin and a water-soluble soap.

4. A substantially dry asphaltic mix as defined in claim 3, wherein the dispersing agent comprises a mixture of materials having the following proportions relative to 100 parts by weight of asphaltic material: At least ¼ part of soluble sulfonated lignin and at least 2 parts of water-soluble soap.

5. A substantially dry asphaltic mix in a finely divided dry powder form characterized by substantially spontaneous dispersibility in water after the particles have become wet, said mix comprising the following components in the following proportions:

| | Parts by weight |
|---|---|
| Finely divided friable asphaltic material | 100 |
| A mixture comprising 8 parts bentonite, 2 parts sodium ligno-sulfonate, 5 parts sodium resinate | 7 |
| Protective organic colloid | 2 |

6. A substantially dry asphaltic mix in a finely divided dry powder form characterized by substantially spontaneous dispersibility in water after the particles have become wet, said mix comprising the following components in the following proportions:

| | Parts by weight |
|---|---|
| Finely divided friable asphaltic material | 100 |
| A mixture comprising 8 parts bentonite, 2 parts sodium ligno-sulfonate and 5 parts sodium resinate | 3 to 25 |
| Protective organic colloid | 2 to 10 |

7. A substantially dry asphaltic mix in a finely divided dry powder form characterized by substantially spontaneous dispersibility in water after the particles have become wet, said mix comprising the following components in the following proportions:

| | Parts by weight |
|---|---|
| Finely divided friable asphaltic material | 100 |
| A mixture comprising at least 3 parts bentonite, at least ¼ part sodium ligno-sulfonate and at least 2 parts sodium resinate | 3 to 25 |
| Protective organic colloid | 2 to 10 |

8. In a method of making a substantially dry finely divided asphaltic composition, the step comprising: simultaneously grinding a mixture of a dry, friable asphaltic material, a dry protective colloid, and a finely divided, dry dispersing agent selected from the group consisting of organic sulfonic acids, salts of organic sulfonic acids, ligno-sulfonate salts, water soluble soaps, polyoxyethylene stearate, sorbitan tristearate, sulfated fatty alcohols and sulfonated alkylphenoxyethanols, to a fineness such that the majority of the particles pass through a 300 mesh screen.

9. The method as defined in claim 8, including the step of grinding the particles flat.

10. The method of making a substantially dry finely divided asphaltic composition, comprising the steps of: crushing a dry, friable asphaltic material to a fineness such that the majority of the particles pass through a 100 to 150 mesh screen, mixing the crushed dry asphaltic material with a finely divided dry protective colloid and a finely divided dry dispersing agent selected from the group consisting of organic sulfonic acids, salts of organic sulfonic acids, ligno-sulfonate salts, water soluble soaps, polyoxyethylene stearate, sorbitan tristearate, sulfated fatty alcohols and sulfonated alkylphenoxyethanols, and grinding the mix to a fineness such that the majority of the particles pass through a 300 to 325 mesh screen.

References Cited in the file of this patent

UNITED STATES PATENTS

| | | |
|---|---|---|
| Re. 15,944 | Kirschbraun | Nov. 11, 1924 |
| 1,620,900 | Kirschbraun | Mar. 15, 1927 |
| 2,314,181 | Winterkorn | Mar. 16, 1943 |
| 2,327,882 | Gabriel et al. | Aug. 24, 1943 |
| 2,376,447 | Mullin | May 22, 1945 |
| 2,431,891 | Rosencranse | Dec. 2, 1947 |
| 2,475,699 | Derksen | July 12, 1949 |
| 2,541,006 | Porter et al. | Feb. 6, 1951 |
| 2,615,851 | Manzer | Oct. 28, 1952 |